May 12, 1970         G. A. BILOCQ         3,511,356
DEVICE FOR RECEIVING, ALIGNING AND CONVEYING WOOD LOGS
Filed July 5, 1968                    2 Sheets-Sheet 1

INVENTOR.
Georges A. BILOCQ
BY
ATTORNEY

May 12, 1970   G. A. BILOCQ   3,511,356
DEVICE FOR RECEIVING, ALIGNING AND CONVEYING WOOD LOGS
Filed July 5, 1968   2 Sheets-Sheet 2

INVENTOR
Georges A. BILOCQ
BY

ATTORNEY 3,511,356
DEVICE FOR RECEIVING, ALIGNING AND CONVEYING WOOD LOGS
Georges A. Bilocq, Plessisville, Quebec, Canada, assignor to Forano Limitee, Plessisville, Quebec, Canada
Filed July 5, 1968, Ser. No. 742,668
Int. Cl. B65g 47/22
U.S. Cl. 198—29                                                 7 Claims

ABSTRACT OF THE DISCLOSURE

Device for receiving, aligning and conveying wood logs comprising a series of parallel rotatable rollers with a helical ridge on their surface having a progressively increasing pitch in the direction of movement of the logs across said rollers; the rollers have also increasing diameters over a portion thereof so that the stresses produced by the impact of logs falling thereon are substantially equalized among said rollers; an additional roller with the largest diameter and without a helical ridge can be provided to bridge the gap between the rollers with the helical ridge and the discharge end of the infeed conveyor from which the logs fall; and a movable upstanding bumper wall alongside said rollers against which the logs abut during their displacement and alignment.

---

This invention relates to a device for receiving, aligning and conveying wood logs prior to their inspection or other similar operation.

More particularly, the invention relates to a progressive pitch spiral log aligning and conveying device which is capable of directly receiving wood logs and aligning them in the proper manner prior to their inspection and classification.

It is well known that presently wood cutting is mostly done on a non-selective basis either as to species of the wood or its quality; also the length and size of cut logs varies to a great extent. Then, upon transportation to a mill or similar factory, the logs are inspected, classified and divided according to their ultimate use.

Up to now, this has been done by throwing the logs, brought up from the field, into a chute from which they fall onto an infeed roller conveyor which leads and projects them against a bumper wall and transversely onto a belt or chain conveyor, and the latter slowly forwards them to an aligning device followed by an inspection station or the like.

This conveying and aligning installation hitherto mostly consisted of a belt or chain conveyor with a bumper wall at its end, onto which the logs fell from the infeed roller conveyor, and of a separate aligning device following said belt or chain conveyor and receiving the logs therefrom. For example, in applicant's U.S. Pat. No. 3,279,582 of Oct. 18, 1966 or his Canadian Pat. No. 753,487 of Feb. 28, 1967, there is described such an arrangement, in which the belt or chain conveyor is followed by an aligner consisting of a plurality of rollers with a helical or spiral ridge on their surface.

Through experience, it has been found, however, that the logs which fall against the bumper wall and onto the belt or chain conveyor will usually damage the latter rather rapidly especially when the conveyor in question is rather short which is now a necessity in most mills due to space saving requirements. The replacement of the belt on such conveyors necessitates, of course, stoppage of the machine and may render the whole operation uneconomical if done too often.

Furthermore, the logs which are brought by the infeed roller conveyor fall transversely onto the belt or chain conveyor over a certain distance thereof, equivalent to the width of said infeed conveyor. Thus, some logs may fall on top of the others which are already moving on the belt and thus entangle the operation. This, again, necessitates stoppage of the system and sometimes additional servicing.

Finally, the fact that the logs must be processed on two separate devices for the purpose of conveying and alignment prior to inspection is another disadvantage since there is always a possibility that although one of the devices will work properly, the other one may require stoppage or servicing or inspection and the whole operation must thus be stopped.

It is therefore an object of the present invention to eliminate all these disadvantages by providing a single device for receiving, aligning and conveying wood logs to an inspection station or the like.

Another object of the invention is to make this device very compact and suitable for installation in any mill or factory.

A still further object of the invention is to provide a device which is simple in structure and yet wear resistant, a device based on the assembly of a plurality of rollers of different diameters and having a progressive pitch spiral or helical ridge on their surface which will practically eliminate the possibility of logs falling on top of other logs and producing entanglement in the operation.

Further objects and advantages of the invention will be made evident from the following more detailed description.

When the applicant found that the combination of a belt or chain conveyor with a separate aligning device, such as already disclosed and claimed in his above-mentioned U.S. and Canadian patents, although suitable for the intended purpose, had several disadvantages which are mentioned above, the first thought was to remove the belt conveyor entirely and to have the logs thrown directly from the infeed conveyor transversely onto the rollers with the spiral ridge while placing the upstanding bumper wall at the end thereof. This, however, proved to be inadequate because when a log fell onto these rollers according to the catenary curve trajectory which is generally the trajectory of their fall, the forward end of said log struck first against the bumper wall and partially against the roller closest to the wall and then the back end of said log fell heavily by gravity onto the rollers farther away from the bumper wall. The rollers onto which the heavy back ends of such logs fell time after time were unable to withstand for any significant length of time such beating and usually became damaged or broken much earlier than those closer to the bumper wall.

Furthermore, this substitution of the belt conveyor by the rollers with a spiral or helical ridge did not eliminate the disadvantage of logs falling on top of the other and entangling the system.

It is therefore quite evident that a simple replacement mentioned above was unsatisfactory.

Thus, although maintaining the idea of using rollers with a helical ridge, the applicant has endeavored to invent an essentially novel and especially advantageous system for this type of operation.

Consequently, according to the present invention, a new device is provided comprising a series of parallel rollers rotatable at equal speed and in the same direction, for receiving, aligning and conveying towards e.g. the inspection station, wood logs falling transversely thereon from an infeed roller conveyor. The new device also comprises an upstanding bumper wall against which the logs strike while falling onto the rollers and against which they abut in their displacement across said rollers. The rollers in the novel device have progressively increasing diameters over a predetermined length which substantially corresponds to the discharge width of the infeed roller conveyor and the roller with the smallest diameter is positioned closest to the bumper wall while that with the largest diameter closest to the point from which the logs fall, namely closest to the discharge end of the infeed roller conveyor. Following this predetermined length in the direction of displacement of the logs, the rollers, with the exception of the one having the smallest diameter, converge to a portion having substantially the same diameter as that of the smallest roller and finally all said rollers terminate with an outwardly expanding frustoconical portion, just prior to the exit of the logs from the device and onto the inspection conveyor or the like. At least all the rollers other than the roller with the largest diameter which is closest to the infeed conveyor, are provided on their surface with a helical ridge which, on each said roller has a same progressively increasing pitch in the direction of displacement of logs and which terminates on the portions of the rollers that have the same diameter.

The rollers usually consist of cylinders made of steel or similar wear resistant material and the fact that their diameters decrease from the point of throw of the logs, equalize the distribution of the stress forces and thus the wear resistance of said rollers and enables their utilization for a long period of time. The diameters of the rollers may be adjusted to follow closely the catenary trajectory of the fall of the logs from the infeed conveyor, thus eliminating the damaging of the rollers which are closest to the point of throw of the logs due to the gravitational fall of their heavy end portions on said rollers as already discussed above. In any case, the adjustment of the diameters of the different rollers will present no difficulty to the man of the art who will be able to adjust them according to his requirements.

However, in order that all the logs be placed in level or horizontal position prior to their forwarding to the inspection station, all the rollers except the one with the smallest diameter taper at a certain point to provide a section where all these rollers have the same diameter.

Furthermore, the rollers are provided with a helical ridge on their surface with progressively increasing pitch in the direction of displacement and alignment of the logs. This increase in pitch provides that during the travel of the logs across the rollers, which logs are actually driven by the spires of the helical ridge, there is left sufficient space between the logs advancing on said rollers for other logs to fall in and to place themselves between the logs already travelling across the rollers instead of falling on top of said logs.

This increase of helical ridge also enables to obtain acceleration of movement of the logs across the rollers while driving the rollers at the same speed and with a same motor.

It should also be noted that the roller with the largest diameter, namely the one which is closest to the infeed conveyor, usually will require no helical ridge on its surface. Its main purpose is to provide support for a log of unusual length and the remaining rollers are entirely sufficient to move said log laterally across their surface.

The bumper wall alongside these rollers preferably has a movable surface onto which the logs abut so as to eliminate friction during movement of said logs. The speed at which this surface of the wall will move in the direction of the log travel will usually be the average speed of the log movement.

The gaps between the rollers will usually be bridged with plates of appropriate size and shape.

Generally three rollers with the helical ridge on their surface and a fourth one without said ridge are sufficient for mosts operations, however, the number of the rollers is not restrictive nor is the size of their diameters or lengths. These can and will easily be adjusted in relation to the size and length of the logs which are processed as well as to the size of the infeed conveyor, etc. The man familiar with the art will have no difficulty in making such adjustments.

A non limitative embodiment of the invention will now be described in greater detail with reference to the appended drawings in which.

Figure 1:
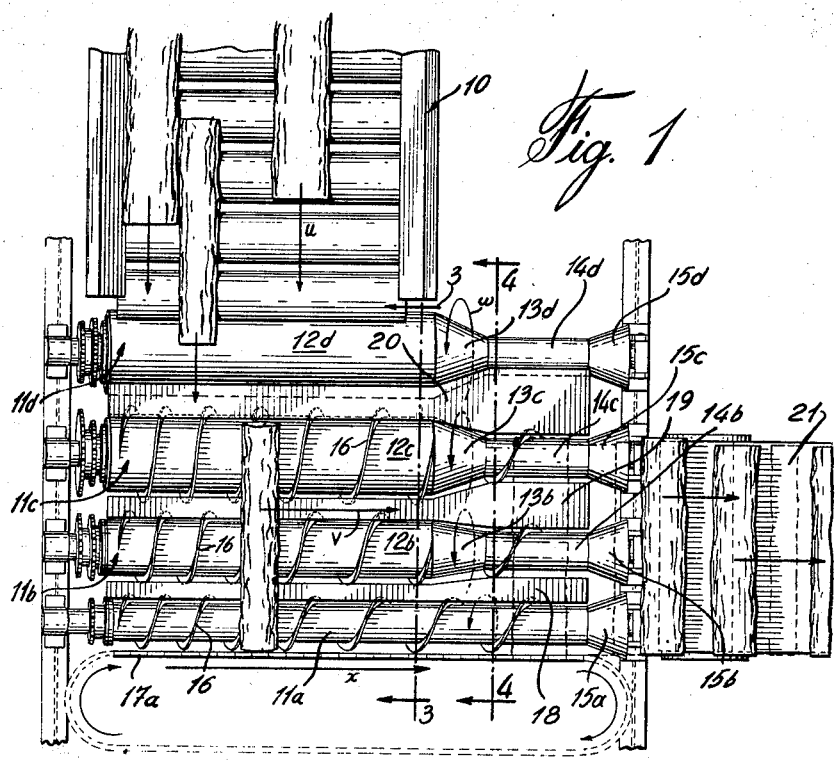
FIG. 1 shows the top view of the device according to the present invention in combination with the infeed conveyor and the inspection station.
Figure 2:
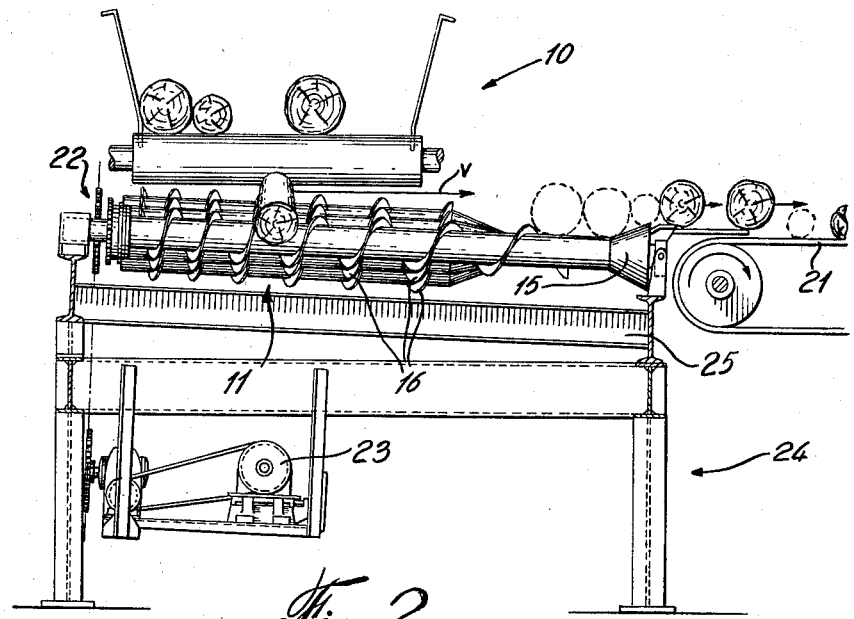
FIG. 2 is the side of the same arrangement as shown in FIG. 1 but without the bumper wall.

In the embodiment illustrated in the drawings, the logs are brought by infeed conveyor 10 and fall onto rollers 11, abutting against surface 17a of bumper wall 17. In this particular case, there are four rollers, namely 11a, 11b, 11c and 11d. The roller 11a is cylindrical in shape except for its outwardly expanding end portion 15a. It has the smallest diameter.

The roller 11b has a portion 12b of larger diameter than that of roller 11a, which is followed in the direction of displacement of the logs shown by arrow v by a tapering portion 13b, then by portion 14b having the same diameter as roller 11a and finally by frustoconical outwardly expanding portion 15b of the same size and shape as portion 15a.

Roller 11c has again a cylindrical portion 12c followed by tapering portion 13c, then by portion 14c of same diameter as that of roller 11a and finally by the outwardly expanding portion 15c.

The same applies to roller 11d in which the respective portions are 12d, 13d, 14d and 15d.

In this particular embodiment, rollers 11a, 11b and 11c are provided with a helical ridge 16 on their surface, said helical ridge 16 on each roller having a progressively increasing pitch in the direction of displacement of the logs across the rollers.

The helical ridge 16 on rollers 11b and 11c projects from the surface of each said roller over the entire portions 12b and 12c with different diameters as well as over the converging portions 13b and 13c and about half of the portions 14b and 14c with the same diameters, while the same ridge on roller 11a projects upwardly from the surface of said roller over the same general length as on rollers 11b and 11c. The point at which this helical ridge terminates is not of prime importance but should not generally be too far from the expanding frustoconical portion 15.

The pitch of the helical ridges on rollers 11a, 11b and 11c is the same and is such that the shortest distance between consecutive spires 16 thereof is capable of receiving a log therebetween to be held and conveyed by said spires, while the longest distance between the spires at the forward end of said rollers in the direction of movement of the logs will usually be such that at least two logs would enter between the consecutive spires and be conveyed thereby. It will, of course, be understood that a great deal of variation is possible here but as one entirely non limitative example, we can mention, for instance, a pitch increasing from about 8 inches to about 18 inches over the entire length of the helical portion of the rollers.

The spires of the helical ridge protruding upward from the surface of the rollers should be such as to engage and forward the logs which are aligned during this operation.

Roller 11d which is closest to the infeed conveyor 10 and which has a portion 12d with the largest diameter of all rollers, need not, in this case, be provided with the helical ridge and serves simply to fill the space between roller 11c and the discharge end of the infeed conveyor 10 and also to support any log that may be of unduly great length. The action of rollers 11a, 11b and 11c is entirely sufficient to transport the logs in the direction shown by arrow $v$.

The frustoconical expanding portion 15 is provided to form at the exit end of the novel device a generally V-shaped log receiving trough from which the logs are pushed one by one onto the inspection conveyor 21. The pushing action is produced by the logs themselves which are conveyed in properly aligned position by rollers 11.

Surface 17a of bumper wall 17 on which the logs bump and abut during their travel and alignment, is preferably movable in the direction shown by arrow $x$ which is the same direction as that of the travel of the logs. This movement is produced by a suitable roller mechanism 17b (see FIG. 3) within the wall 17 which is already known in the art. The speed of movement of this wall will approximately be the average speed of log advancement.

The gaps between the different rollers may be filled with suitable plates 18, 19 and 20 to avoid that pieces of wood or bark drop underneath and clog the device or the motor 23 which may be positioned beneath the rollers.

All said rollers may be rotated by the same motor 23 through a gearing arrangement 22 and may be positioned on a beam structure 24 onto which the support which holds the motor may be attached. Also, on top of beam structure 24 there may be provided a secondary beam 25 which is actually used to hold the rollers 11 and which is inclined towards the discharge end of said rollers. The inclining may be useful to provide a better movement of the logs across the surface of said rollers.

Figure 3:
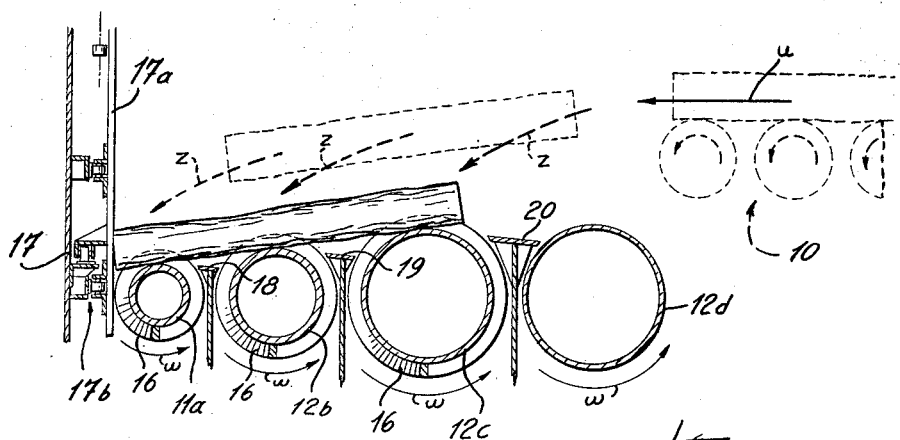
FIG. 3 is the sectional view along line 3—3 of FIG. 1, with some additional details shown in broken line.
Figure 4:
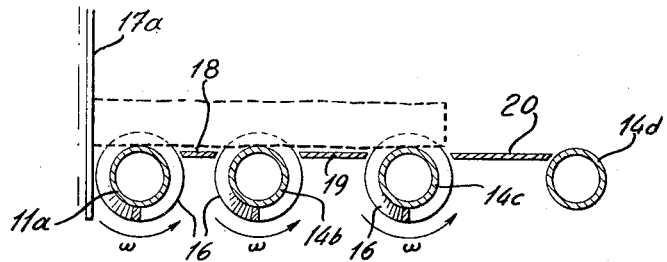
FIG. 4 is the section view along line 4—4 of FIG. 1.

All rollers are rotatable in the direction shown by arrow $w$ in FIGS. 1, 3 and 4.

In FIG. 3 it is also clearly shown that the logs, after moving on infeed conveyor 10 in the direction indicated by arrow $u$, fall from said conveyor onto the rollers generally according to the catenary trajectory shown arrow $z$; they fall on said rollers with substantially even distribution of the weight of the logs on each roller. From this figure, it is clear that the portions 11a, 12b and 12c of the rollers on which the logs fall are adapted to have such diameter that the logs will fall substantially with even distribution of the weight on each of said rollers and thus no roller will be imparted with greater impact or stress than the other rollers. Upon falling on said rollers the log will be conveyed in inclined (non-horizontal) position until it reaches the portion where the rollers have the same diameter and which is shown in FIG. 4. There, the log takes a horizontal or level position from which it is then discharged onto the inspection conveyor after passing over the expanded frustoconical portion 15.

The operation of the whole mechanism is simple and efficient. The logs coming from the infeed conveyor 10 in the direction shown by arrow $u$ at speeds in the neighborhood of for example 500 feet per minute, fall as shown by arrow $z$ on rollers 11 provided with helical ridge 16 and are conveyed thereby in the direction shown by arrow $v$ at speeds, for example, of about 125 feet per minute towards the inspection station or conveyor 21. During this movement the logs are aligned by the spires of the helical ridge. It should be understood that the given speeds are not critical. During their fall on the rollers the logs strike and abut onto upstanding bumper wall 17 with movable surface 17a which moves in the same direction as the logs at the same average speed of about 125 feet per minute, in this particular example.

The total length of the device can, of course, be varied to a large extent, however, from a practical viewpoint this length need not be exaggerated both in order to save space and to avoid extra constructional expenses. Total lengths of about 12 feet are suitable for most purposes.

The same consideration applies to the rollers. They can be in the form of hollow cylinders as shown in FIGS. 3 and 4. The thickness of the wall of said cylinders is again not critical but it should be sufficient to withstand for a long period of time the stresses produced by logs falling thereon. The last roller without the spiral ridge can, however, be of weaker material since it very seldom receives any direct impact from the falling logs. The rollers can be mounted on suitable rotatable shafts driven by the motor 23 through gearing arrangement 22.

The height of the discharge end of the infeed conveyor 10 over the rollers 11 is also usually adjustable.

It is therefore quite evident that many modifications may be made within the scope of the invention and that it should not be limited by the specifically described or illustrated embodiment but rather by the subject matter of the appended claims.

I claim:

1. A device for receiving aligning and conveying wood logs comprising:

a series of parallel rollers rotatable at equal speed and in the same direction, for receiving, aligning and conveying wood logs falling transversely thereon;

an upstanding bumper wall alongside said rollers against which the logs strike when falling onto the rollers and against which they abut in their displacement across said rollers;

said rollers having progressively increasing diameters over a predetermined length thereof, with the roller having the smallest diameter being positioned closest to the bumper wall and that having the largest diameter closest to the point from which the logs fall, and following said predetermined length, in the direction of displacement of the logs, said rollers with the exception of that having the smallest diameter, converge to a portion having substantially the same diameter as that of the smallest roller, and finally all said rollers terminate with an outwardly expanding frustoconical portion; and a helical ridge on the surface of at least all the rollers other than the roller with the largest diameter, to drive and align the logs longitudinally across said rollers, said helical ridge having on each said roller a same progressively increasing pitch in the direction of displacement of the logs and terminating on the portion of the rollers having the same diameter.

2. A device according to claim 1, in which the bumper wall is of substantially the same length as that of the rollers and comprises a surface, onto which the logs abut, movable in the direction of displacement of the logs and at the average speed of said displacement.

3. A device according to claim 1, further comprising means for mounting said rollers in downwardly inclined position relative to the direction of displacement of said logs.

4. A device according to claim 1, further comprising plates bridging the gaps between said rollers.

5. A device accordingly to claim 1, comprising three parallel cylindrical rollers with helical ridges thereon and one cylindrical roller, having the largest diameter over the predetermined length, without helical ridge.

6. A device for receiving, aligning and conveying wood logs comprising:

a series of parallel rollers rotatable at equal speed and in the same direction, for receiving, aligning and conveying wood logs falling transversely thereon;

means for mounting said rollers in downwardly inclined position relative to the direction of displacement of said logs;

an upstanding bumper wall alongside the rollers of substantially same length as that of said rollers, against which the logs bump when falling onto the rollers and against which they abut in their displacement across said rollers, said wall having a surface, onto which the logs abut, movable in the direction of displacement of the logs;

means for driving said surface of the wall in the direction of displacement of the logs and substantially at the average speed of said logs;

said rollers having progressively increasing diameters over a predetermined length thereof with the roller having the smallest diameter being positioned closest to the bumper wall and that having the largest diameter closest to the point from which the logs fall, and following said predetermined length in the direction of displacement of the logs, said rollers, with the exception of that having the smallest diameter, converge to a portion having substantially the same diameter as that of the smallest roller, and finally all said rollers terminate with an outwardly expanding frustoconical portion;

a helical ridge on the surface of at least all the rollers other than the roller with the largest diameter, to drive and align the logs longitudinally across said rollers, said helical ridge having on each said roller a same progressively increasing pitch in the direction of displacement of the logs and terminating on the portion of the rollers having the same diameter; the pitch of said helical ridge being such as to receive, on at least a portion of the rollers' length, more than one log between consecutive spires thereof; and means for simultaneously rotating said rollers to cause advancement of the logs across said rollers in the direction of displacement.

7. In combination, a device as claimed in claim 6, an infeed conveyor for feeding wood logs and projecting them transversely onto the portion of the rollers having different diameters and an exit conveyor following the frustoconical portion of the rollers for receiving already aligned logs and forwarding them to the following operation.

References Cited

UNITED STATES PATENTS

| | | | |
|---|---|---|---|
| 3,029,923 | 4/1962 | Bilocq et al. | 198—29 |
| 3,127,829 | 4/1964 | Rossi | 198—104 X |
| 3,214,000 | 10/1965 | Bilocq | 198—33 |
| 3,279,582 | 10/1966 | Bilocq | 198—33 |

EVON C. BLUNK, Primary Examiner

D. D. WATTS, Assistant Examiner

U.S. Cl. X.R.

198—104, 213